United States Patent
Menendez

(10) Patent No.: US 11,608,560 B2
(45) Date of Patent: Mar. 21, 2023

(54) ORGANIC BLEND ADDITIVE USEFUL FOR INHIBITING LOCALIZED CORROSION OF EQUIPMENT USED IN OIL AND GAS PRODUCTION

(71) Applicant: Baker Hughes, Houston, TX (US)

(72) Inventor: Carlos M. Menendez, Houston, TX (US)

(73) Assignee: Baker Hughes Holdings LLC, Houston, TX (US)

(*) Notice: Subject to any disclaimer, the term of this patent is extended or adjusted under 35 U.S.C. 154(b) by 168 days.

(21) Appl. No.: 17/124,708

(22) Filed: Dec. 17, 2020

(65) Prior Publication Data
US 2021/0102298 A1 Apr. 8, 2021

Related U.S. Application Data

(63) Continuation of application No. 16/577,972, filed on Sep. 20, 2019, now Pat. No. 10,968,524.

(60) Provisional application No. 62/734,752, filed on Sep. 21, 2018.

(51) Int. Cl.
| | |
|---|---|
| C23F 11/14 | (2006.01) |
| C23F 11/18 | (2006.01) |
| C23F 11/12 | (2006.01) |
| C09K 8/54 | (2006.01) |

(52) U.S. Cl.
CPC .......... *C23F 11/149* (2013.01); *C23F 11/124* (2013.01); *C23F 11/181* (2013.01); *C09K 8/54* (2013.01)

(58) Field of Classification Search
None
See application file for complete search history.

(56) References Cited

U.S. PATENT DOCUMENTS

| | | | |
|---|---|---|---|
| 6,228,283 | B1 | 5/2001 | Turcotte et al. |
| 7,615,516 | B2 | 11/2009 | Yang et al. |
| 9,518,328 | B1 | 12/2016 | Whited et al. |
| 2007/0075120 | A1 | 4/2007 | Yang et al. |
| 2014/0070134 | A1* | 3/2014 | Woyciesjes ............. C09K 5/20 252/75 |

(Continued)

FOREIGN PATENT DOCUMENTS

WO 2017189528 A1 11/2017

OTHER PUBLICATIONS

Anderko, A., et al, "A General Model for the Repassivation Potential as a Function of Multiple Aqueous Species. 2. Effect of Oxyanions on Localized Corrosion of Fe—Ni—Cr—Mo—W—N Aliys", Corrosion Science 50, Aug. 2008, 3629-3647.

(Continued)

*Primary Examiner* — Jeffrey D Washville
(74) *Attorney, Agent, or Firm* — Crowe & Dunlevy, P.C.

(57) ABSTRACT

An organic blend chemical additive comprising more than 50 wt. % organic solvent (e.g. methanol and/or ethylene glycol), less than 10 wt. % water, a nitrate salt, a maleic acid copolymer, and optionally an imidazoline may be delivered to a production well through a conduit having a stainless steel and corrosion resistant metal alloy surface, such as a capillary string or an umbilical tubing, the organic blend chemical additive being shown to be useful in inhibiting localized corrosion of and improving the repassivation of the equipment or conduit.

18 Claims, 4 Drawing Sheets

| Blend | Eocp (Volts) | Epit-Eocp (Volts) | Erep-Eocp (Volts) |
|---|---|---|---|
| A | 0.014 | 0.791 | 1.000 |
| B | 0.147 | 0.647 | 0.953 |
| C | 0.004 | 0.755 | 1.005 |

(56) References Cited

U.S. PATENT DOCUMENTS

2016/0084051 A1 3/2016 Vinegar et al.
2016/0208157 A1 7/2016 Vo
2017/0114272 A1* 4/2017 Vo .................... C09K 8/03
2018/0105732 A1 4/2018 Okocha et al.
2020/0017745 A1* 1/2020 Dietl .................. C23F 11/182

OTHER PUBLICATIONS

Uhlig, H. H., et al., "Pitting of 18-8 Stainless Steel in Ferric Chloride Inhibited By Nitrates", Corrosion, vol. 20, Sep. 1964, 289-292.
Zakeri, M., et al., "Investigation on the effect of nitrate ion on the critical pitting temperature of 2205 duplex stainless steel along a mechanistic approach using pencil electrode" Corrosion Science 85, Apr. 2014, 222-231.
Finsgar, Matjaz, et al., "Application of corrosion inhibitors for steels in acidic media for the oil and gas industry: A review", Corrosion Science, May 2014, vol. 86, pp. 17-41.
Singh, A.K., et al., "Electrochemical Corrosion of Steels in Distillery Effluent", International Journal of Materials and Metallurgical Engineering, vol. 11, No. 6, 2017; 439-444.
Ramachandran, Sunder, et al. "Self-Assembled Monolayer Mechanism for Corrosion Inhibition of Iron by Imidazolines", Langmuir, Jun. 1996, 12, 6419-6428.

* cited by examiner

| Blend | Eocp (Volts) | Epit-Eocp (Volts) | Erep-Eocp (Volts) |
|---|---|---|---|
| A | -0.052 | 0.845 | 1.185 |
| B | -0.096 | 0.883 | 0.900 |
| E | 0.007 | 0.788 | 0.190 |

| Blend | Eocp (Volts) | Epit-Eocp (Volts) | Erep-Eocp (Volts) |
|---|---|---|---|
| F (2205) | -0.173 | 0.603 | 0.132 |
| G (316L) | -0.153 | 0.495 | 0.253 |
| G (2205) | -0.144 | 0.655 | 0.517 |

ORGANIC BLEND ADDITIVE USEFUL FOR INHIBITING LOCALIZED CORROSION OF EQUIPMENT USED IN OIL AND GAS PRODUCTION

CROSS-REFERENCE TO RELATED APPLICATION

This application is a continuation application from U.S. patent application Ser. No. 16/577,972 filed Sep. 20, 2019, issued as U.S. Pat. No. 10,968,524 on Apr. 6, 2021, incorporated herein by reference in its entirety.

CROSS-REFERENCE TO RELATED APPLICATION

This application claims the benefit of Provisional Patent Application No. 62/734,752 filed Sep. 21, 2018, which is incorporated by reference herein in its entirety.

TECHNICAL FIELD

The invention relates to the use of an organic chemical blend additive to inhibit corrosion in oil and gas production applications, and more particularly relates to using such an additive for inhibiting localized corrosion of chemical injection equipment used in the production of oil and gas.

BACKGROUND

It is well known that steel and alloy made tubulars and equipment used in the production of oil and gas are exposed to corrosive environments. Such environments generally contain acid gases ($CO_2$ and $H_2S$) and brines of various salinities. Under such conditions, the steel or alloy will corrode, possibly leading to equipment failures, injuries, environmental damage, and economic loss.

While the rate at which corrosion will occur depends on a number of factors, such as the type of metal or alloy, partial pressure of the acid gases, salinity, pH, temperature, etc., some sort of corrosion almost inevitably occurs. One way to mitigate this problem is to introduce corrosion inhibitors in the hydrocarbon production system.

Corrosion inhibitors are widely introduced into oil and gas production wells and pipeline transmission lines to help prevent or reduce corrosion of carbon steel surfaces coming into contact with fluids or gases produced from wells.

Methanol-based organic blends containing corrosion and scale inhibitors are sometimes delivered to production fluids or gases through capillary strings and umbilical tubing to aid in reducing or preventing corrosion of or formation of scale upon carbon steel surfaces in the well that come into contact with the production fluid or gas. However, the use of such methanol-based organic blends, because of the presence of chlorides, have been shown to generate pitting corrosion of (i.e. localized corrosion) and to reduce the repassivation ability of the stainless steel (e.g. 316L) and corrosion resistant alloy (e.g. Duplex 2205) capillary strings and umbilical tubing that are being used to deliver chemicals into the production well.

It would be advantageous to develop an organic chemical blend additive that would help to inhibit this localized corrosion of the stainless steel or corrosion resistant alloy made capillary string and umbilical tubing while still being useful to inhibit corrosion of and reduce scale formation upon other metal surfaces in a production well.

SUMMARY

There is provided, in one form, a method of inhibiting corrosion upon a metal surface of equipment used to deliver additives into a production well in which an organic chemical blend is introduced to the well through a conduit, such as a capillary string or umbilical tubing, the organic chemical blend additive being made up of a nitrate salt, a maleic acid copolymer, greater than 50 wt. % of an organic solvent, other organic components and less than 10 wt. % water and the amount of the organic chemical blend additive introduced being effective to inhibit localized corrosion of and to improve repassivation potential of a stainless steel and corrosion resistant alloy surface of the capillary string or umbilical tubing.

There is also provided, in another non-restrictive form, a treated system containing a conduit for delivering additives into a production well having a metal or metal alloy surface, and an organic chemical blend additive comprising a nitrate salt, a maleic acid copolymer, other organic components, greater than 50 wt. % of an organic solvent, and less than 10 wt. % water.

In yet another form, an imidazoline may additionally be included in the organic chemical blend additive to aid in inhibiting corrosion or improving repassivation of metal surfaces of equipment and conduits used to deliver additives into a production well.

DETAILED DESCRIPTION

Figure 1:
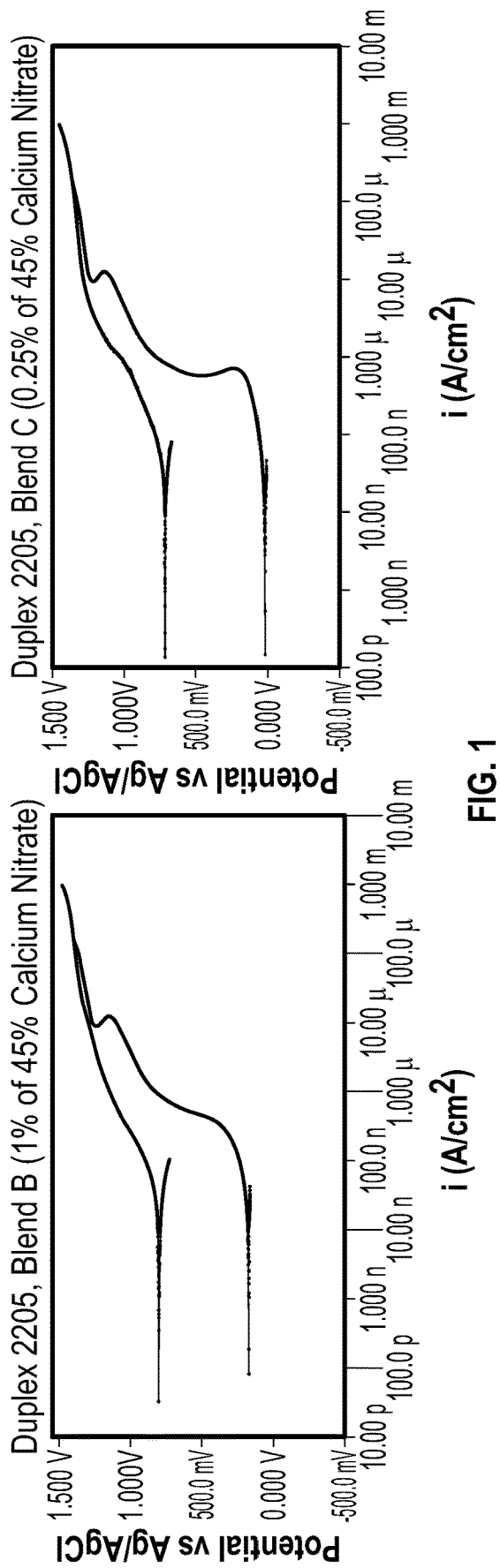
FIG. 1 is a set of graphs comparing the pitting potential, repassivation potential, and open circuit potential when organic chemical blend additives having the compositions set forth in Table 1 are applied to a Duplex 2205 alloy surface of a capillary string.
Figure 1:
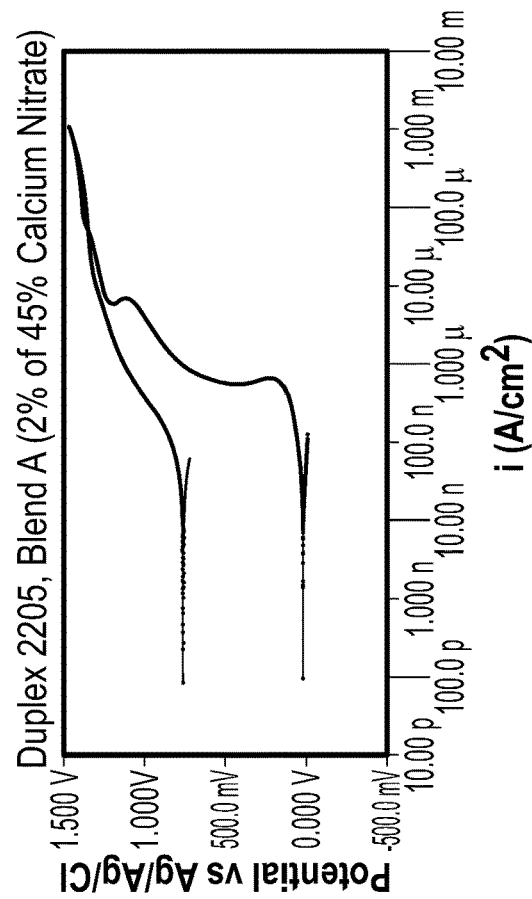

As previously noted, metal and metal alloy made conduits, pipes, tubing, and other equipment used to deliver chemicals and additives useful in the production of oil and gas from a well can experience localized corrosion (pitting) from the chemicals being delivered. It has been discovered that an effective amount of organic chemical blend additive made predominantly of an organic solvent containing a nitrate, a maleic acid copolymer, less than 10 wt. % water, and optionally an imidazoline may be useful to inhibit localized corrosion and improve repassivation of metal and metal alloy surfaces of equipment used to deliver additives and chemicals to production wells.

The most commonly used equipment for delivering chemicals and additives to production wells are capillary strings and umbilical tubing. These conduits run down to the bottom of the well and the intake point of an electrical submersible pump to allow for delivery of chemicals and additives to the fluid in the well. Often, these pieces of equipment are made from stainless steel, such as 316L, or corrosion resistant alloys, such as Duplex 2205, but are not necessarily limited to these specific types of metal or metal alloys.

In one embodiment, the organic chemical blend additive contains or includes a nitrate salt, a maleic acid copolymer, greater than 50 wt. % of an organic solvent, and less than 10 wt. % water.

Suitable nitrates salts include, but are not limited to, calcium nitrate, sodium nitrate, potassium nitrate, or a combination thereof. Calcium nitrate, in particular, is shown to have better solubility in organic solvents such as methanol or ethylene glycol.

An example of the maleic acid copolymer that may be used in the organic chemical blend additive is, without limitation, propenoic acid, ethyl ester, polymer with ethenyl acetate, and/or 2,5-furandione, hydrolyzed. This copolymer is included to aid in the reduction of scale formation in the production fluid or any metal surfaces in contact with production fluid. The amount of maleic acid copolymer in the organic chemical blend additive ranges from about 1 wt. % to about 15 wt. %.

Suitable organic solvents useful in the organic chemical blend additive may include methanol, ethylene glycol, isopropyl alcohol, 2-butoxyethanol, propylene glycol, butyl carbitol, and combinations thereof.

In one non-restrictive embodiment, the blend is organic-solvent based. That is, the amount of the organic solvent in the organic chemical blend additive is greater than 50% wt. % and alternatively, greater than 70 wt. %, based on the total amount of organic chemical blend additive. Water is present in a small amount, for example, in an amount less than 10 wt. %, and alternatively less than 5 wt. %, based on the total amount of organic chemical blend additive.

In one non-limiting embodiment, the amount of nitrate present in the blend ranges from about 0.25% of a 45% aqueous solution of nitrate salt to about 5% of a 45% aqueous solution of the nitrate salt. In yet another embodiment, the nitrate salt is present in the organic chemical blend additive in an amount less 2% of a 45% aqueous solution of nitrate.

In an alternative embodiment, the organic chemical blend additive further comprises an imidazoline to help improve corrosion inhibition and repassivation potential of the metal surface of a conduit used to deliver chemicals and additives to a production well. Imidazolines useful in the organic chemical blend additive for this purpose may have the following general formula:

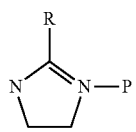

In this formula, R describes the hydrophobic tail portion of the molecule and P describes the pendant group of the molecule. In one embodiment, R is a tall oil fatty acid. The pendant group, P, may be selected from a group consisting of $(CH_2—CH_2)$-X, $(CH_2—CH_2—O)_nH$, $CH_2—CH_2—$ $(NH—CH_2—CH_2)_yNH—CO—R1$, wherein X may be $NH_2$, OH, or NH—CO—R2, n is 10, and y is equal to or greater than 2. The proportions of the optional imidazoline in the organic chemical blend additive may range from about 5 wt. % independently to about 30 wt. %.

It is difficult to predict in advance what amount of organic chemical blend additive should be introduced to the production well to achieve an optimum corrosion inhibition and repassivation improvement because such amount is dependent upon many interrelated variables such as, for example, the nature of the production fluid being extracted from the production well, the nature of other the oilfield chemicals being delivered, and nature of the metal surface of the conduits and other equipment used to deliver chemicals to the production well or to carry the production fluid, etc. Nevertheless, in one non-limiting example, the amount of organic chemical blend additive being delivered ranges from about 10 ppm independently to about 1000 ppm independently. Alternatively, the amount of organic chemical blend additive being delivered may range from about 50 ppm independently to about 300 ppm independently or range from about 75 ppm independently to about 150 ppm independently. The amounts in this paragraph are based on the total amount of production fluid in the well. As used herein with respect to a range, "independently" means that any threshold may be used together with another threshold to give a suitable alternative range, e.g. about 50 ppm independently to about 1000 ppm independently is also considered a suitable alternative range.

For purposes of this disclosure, the term "inhibit" is defined to mean reduce, suppress, or prevent. It is not necessary for the corrosion, localized or general, and scaling of the metal surfaces of capillary string, umbilical, tubing, or other oil and gas production or piping having metal surfaces to be entirely prevented for the chemical blend additives discussion herein to be considered effective, although complete prevention is a desirable goal.

The invention will be further described with respect to the following Examples, which are not meant to limit the invention, but rather to further illustrate the various embodiments.

EXAMPLES

Figure 2:
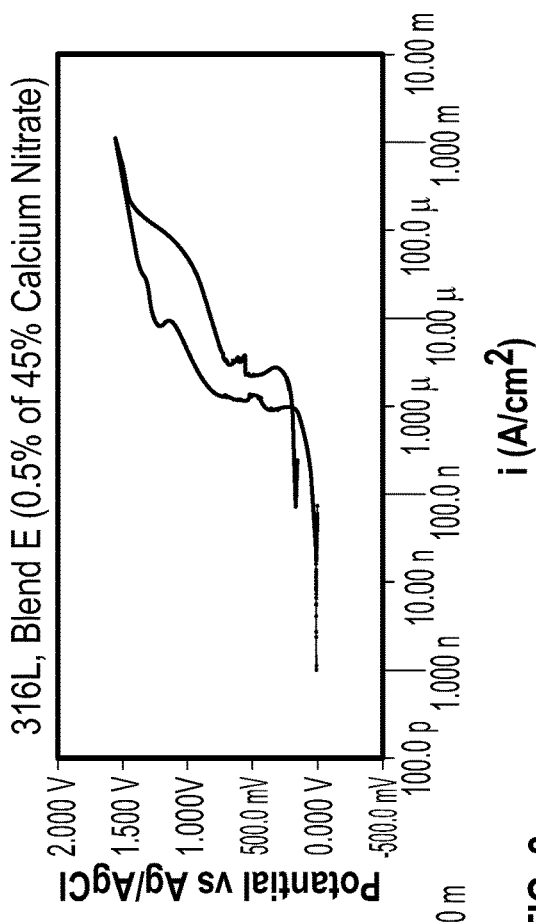
FIG. 2 is a set of graphs comparing the pitting potential, repassivation potential, and open circuit potential when the organic chemical blend additives having the compositions set forth in Table 1 are applied to a stainless steel 316L surface of a capillary string.
Figure 2:
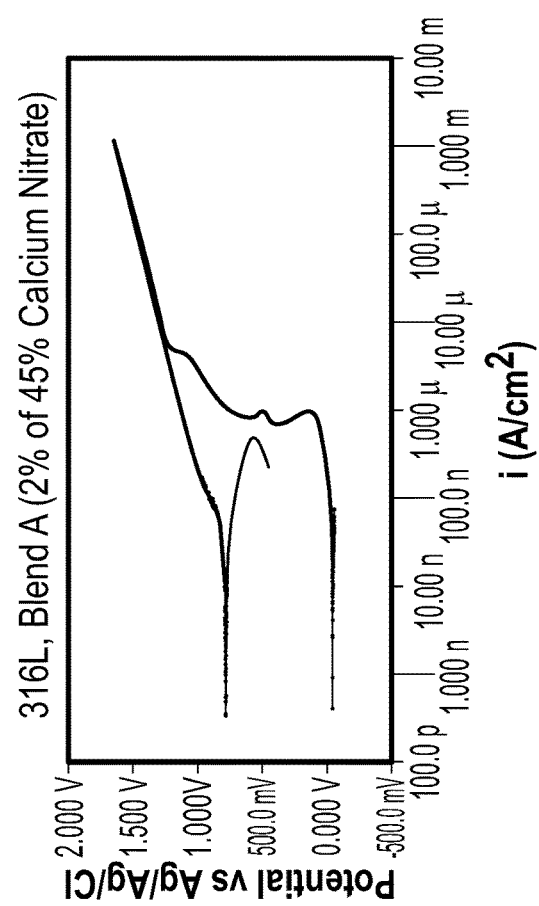
Figure 2:
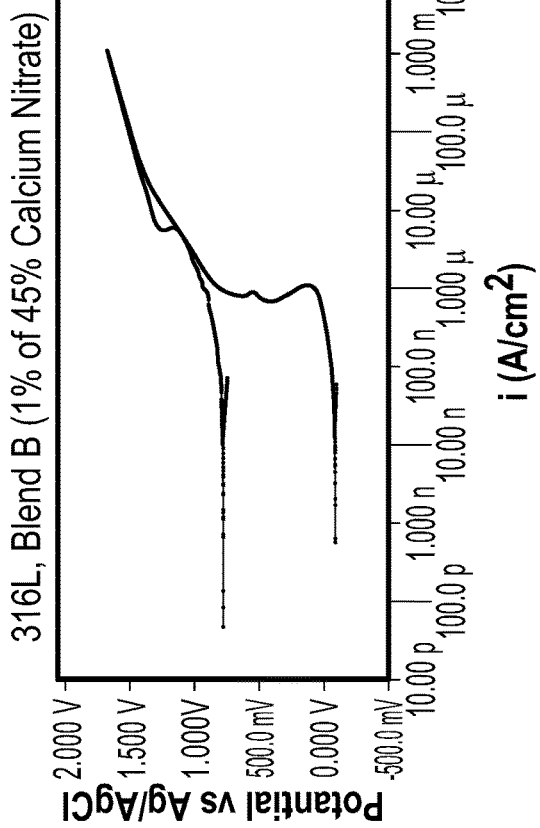

The Cyclic Potentiodynamic Polarization ("CPP") graphs in FIG. 1 and FIG. 2 depict the pitting potential, repassivation potential, and open circuit potential performance of organic chemical blend additives having the compositions set forth in Table 1 below upon a Duplex 2205 alloy surface and upon a stainless steel 316L surface of a capillary string. Erep-Eocp is the difference between the repassivation potential (Erep) and the open circuit potential (Eocp). The larger the difference in these values, the more the metal tends to repassivate. An Erep-Eocp>200 mV represents an effective protection of the metal surface.

The curves on FIG. 1 demonstrate that an organic chemical blend additive containing a maleic acid copolymer, at least 50 wt. % organic solvent, and less than 10 wt. % water, and 0.25% of a 45% aqueous solution of calcium nitrate achieves the same amount of corrosion inhibition and repassivation improvement on Duplex 2205 metal surface as an organic chemical blend additive containing a maleic acid copolymer, at least 50 wt. % organic solvent, and less than 10 wt. % water, and 1 or 2% of a 45% aqueous solution of calcium nitrate on the same type metal surface.

The performance was a bit different when the organic chemical blend additive was applied to a stainless steel 316L surface. While an additive containing only 1% of a 45% aqueous solution of calcium nitrate performed just as well in inhibiting corrosion and improving repassivation potential as an additive that contained 2% of a 45% aqueous solution of calcium nitrate, the results were not as good when an additive with 0.5% of a 45% aqueous solution of calcium nitrate was applied to the stainless steel surface, as shown the curves in FIG. 2. These results indicate that determining what amount of components is necessary to achieve good results may depend on the stainless steel or alloy used on a given capillary string or umbilical tubing.

Figure 3:
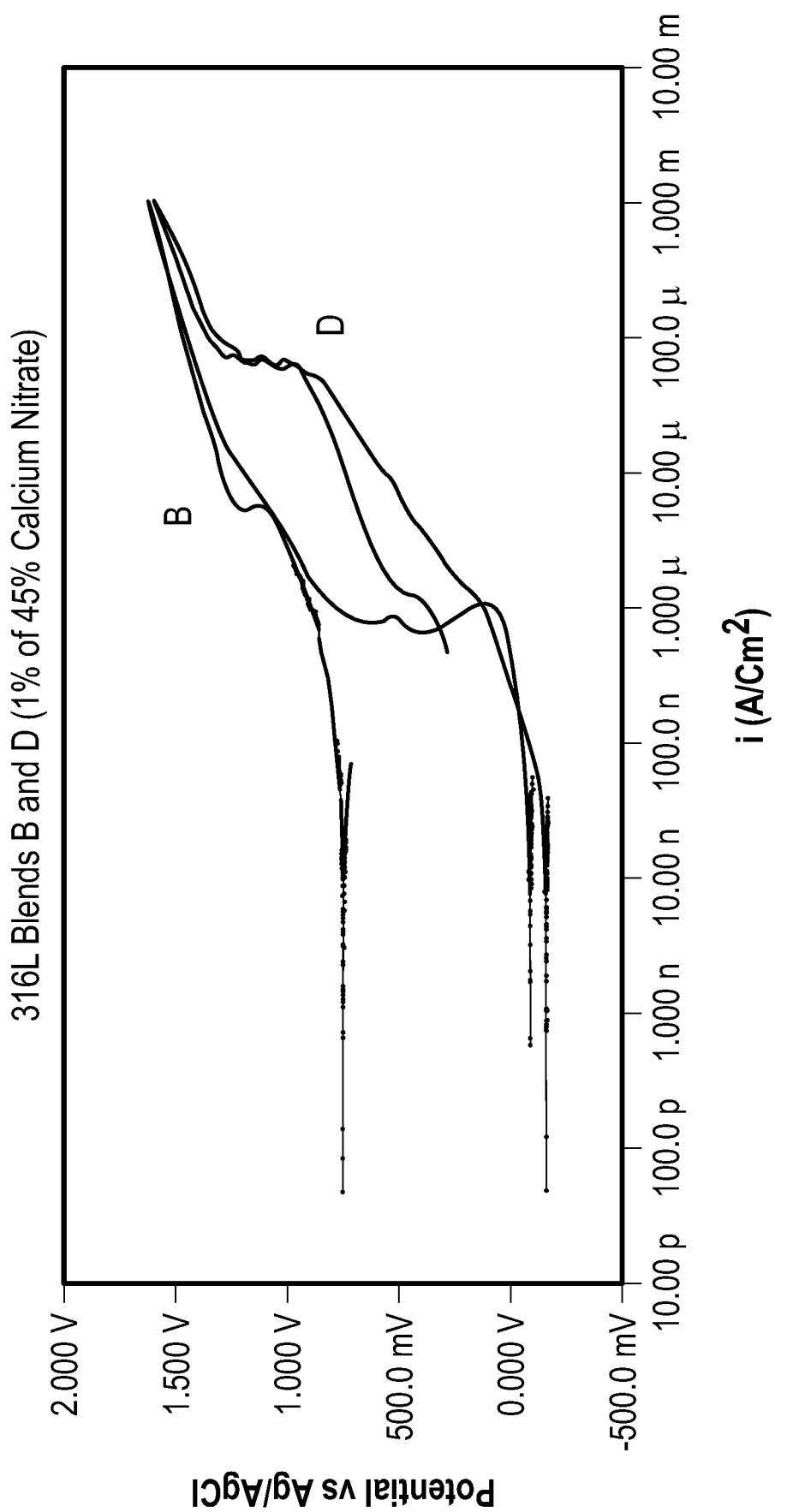
FIG. 3 is a graph comparing the performance of an organic chemical blend additive that contains both calcium nitrate and a maleic acid copolymer to the performance of an organic chemical blend additive that doesn't include a maleic acid copolymer upon a Duplex 2205 alloy surface and a stainless steel 316L surface of a capillary string.

In addition, the CPP graph in FIG. 3 indicates that there is a significant improvement in corrosion inhibition and repassivation improvement with an organic chemical blend additive that contains both the nitrate salt and a maleic acid copolymer, Blend B, represented by curve B as compared to an organic chemical blend additive that doesn't include a maleic acid copolymer, Blend D, represented by curve D. These results suggest that the maleic acid co-polymer may act synergistically with the nitrate salt to improve repassivation behavior and inhibit localized corrosion.

Table 1 shows the composition of Blends A, B, C, D, and E, the CPP graphs of which are shown in FIGS. 1, 2, and 3.

TABLE 1

Chemical Blend Additive Compositions

|  | Component | | | | |
| --- | --- | --- | --- | --- | --- |
|  | A (%) | B (%) | C (%) | D (%) | E (%) |
| Maleic acid copolymer | 2-10 | 2-10 | 2-10 | 0.0 | 2-10 |
| Water | <10 | <10 | <10 | <10 | <10 |
| Methanol | 40-70 | 40-70 | 40-70 | 40-70 | 40-70 |
| Ethylene Glycol | 10-30 | 10-30 | 10-30 | 10-30 | 10-30 |
| 45% Calcium Nitrate in water | 2.0 | 1.0 | 0.25 | 1.0 | 0.5 |
| Other Organic compounds | 10-25 | 10-25 | 10-25 | 10-25 | 10-25 |

Figure 4:
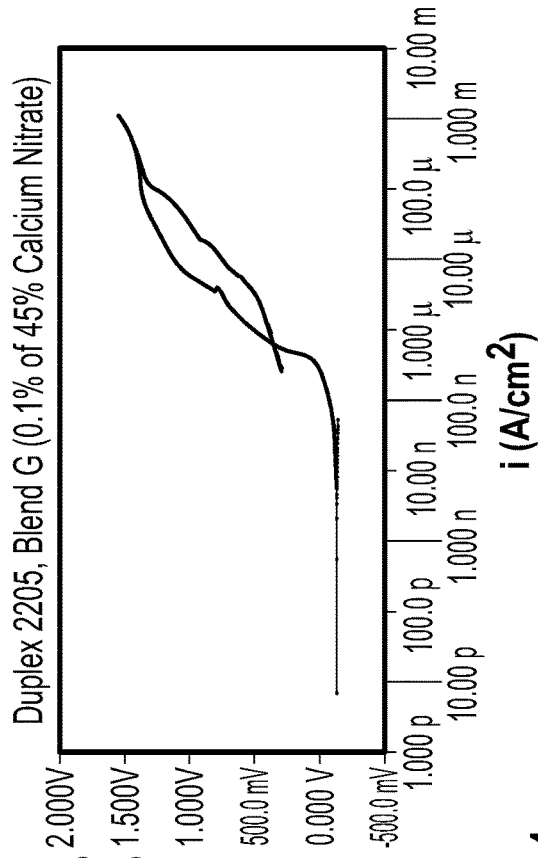
FIG. 4 is a set of graphs comparing the pitting potential, repassivation potential, and open circuit potential when organic chemical blend additives having the compositions set forth in Table 2 are applied to a Duplex 2205 alloy surface and a stainless steel 316L surface of a capillary string.
Figure 4:
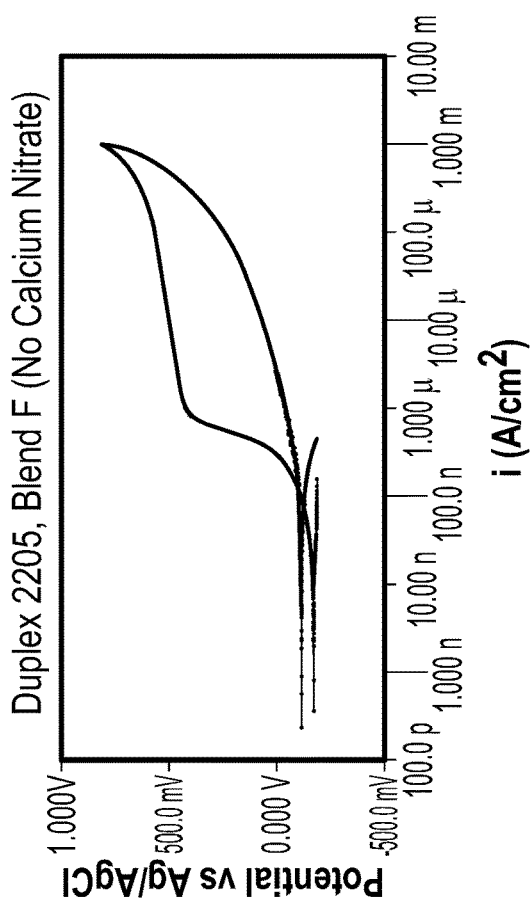
Figure 4:
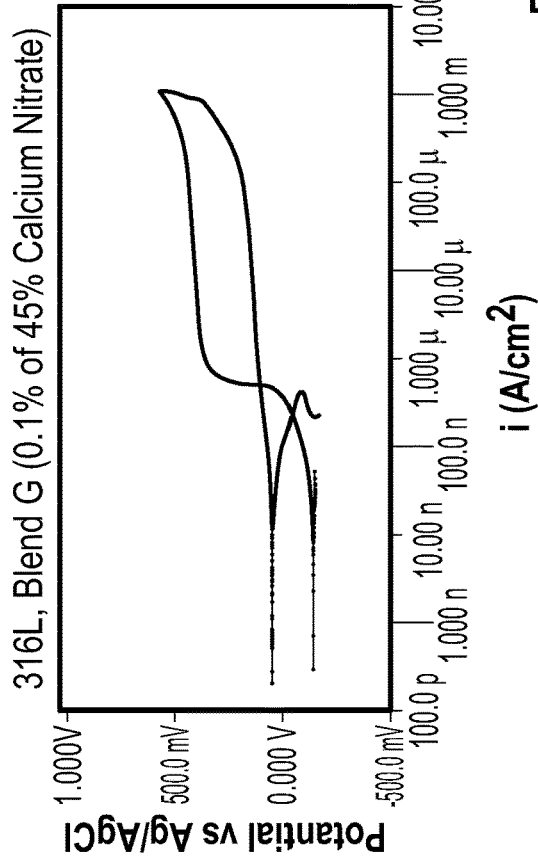

The CPP graphs in FIG. 4 depict the pitting potential, repassivation potential, and open circuit potential curves of the organic chemical blend additives further containing an ethoxylated imidazoline, as set forth in the compositions in Table 2 below, upon a Duplex 2205 alloy surface and upon a stainless steel 316L surface.

TABLE 2

Chemical Blend Additive Compositions-with an Imidazoline

|  | Component | |
| --- | --- | --- |
|  | F (%) | G (%) |
| Ethoxylated Imidazoline | 10-30 | 10-30 |
| Maleic acid copolymer | 2-10 | 2-10 |
| Water | <10 | <10 |
| Methanol | 40-70 | 40-70 |
| Ethylene Glycol | 10-30 | 10-30 |
| 45% Calcium Nitrate in water | 0.0 | 0.1 |
| Other Organic Components | 10-25 | 10-25 |

FIG. 4 demonstrates that the addition of an ethoxylated imidazoline to the organic chemical blend additive, for example, greatly improves the repassivation behavior of Duplex 2205 even when the organic chemical blend additive contains only 0.1% of a 45% aqueous solution of calcium nitrate, a smaller amount than otherwise employed or expected to achieve an Erep-Eocp larger than 200 mV. These results suggest that the imidazoline may act synergistically with the nitrate salt and the maleic acid copolymer to improve repassivation behavior and inhibit localized corrosion.

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, metallurgy, equipment, nitrates, maleic acid copolymers, organic solvents, and other components, falling within the claimed parameters, but not specifically identified or tried in a particular fluid, blend, or method, are expected to be within the scope of this invention.

The present invention may suitably comprise, consist or consist essentially of the elements disclosed and may be practiced in the absence of an element not disclosed. For example, the method may consist of or consist essentially of introducing an organic chemical blend additive to a production well via a conduit having a metal surface, the organic chemical blend additive consisting essentially of or consisting of a nitrate salt, a maleic acid copolymer, greater than 50 wt. % of an organic solvent, and less than 10 wt. % water. As another example, the treated system may comprise, consist of, or consist essentially of: a conduit for delivering additives to a production well having a metal or metal alloy surface; and organic chemical blend additive consisting essentially of or consisting of a nitrate salt, a maleic acid copolymer, greater than 50 wt. % of an organic solvent, and less than 10 wt. % water.

In another non-limiting embodiment, the additive may comprise, consist essentially of, or consist of a nitrate salt, a maleic acid copolymer, greater than 50 wt. % of an organic solvent, and less than 10 wt. % water.

In a different non-restrictive version, the additive may comprise, consist essentially of, or consist of, a nitrate salt, a maleic acid copolymer, an imidazoline, greater than 50 wt. % of an organic solvent, and less than 10 wt. % water.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "about" in reference to a given parameter is inclusive of the stated value and has the meaning dictated by the context (e.g., it includes the degree of error associated with measurement of the given parameter).

What is claimed is:

1. An organic chemical blend additive corrosion inhibitor comprising:
a nitrate;
a maleic acid copolymer that is a polycarboxylic acid having the following chemical description: propenoic acid, ethyl ester, polymer with ethenyl acetate and 2,5 furandione, hydrolyzed;
an organic solvent in an amount greater than 50 wt. %, based on a total amount of the organic chemical blend additive; and
less than 10 wt. % water, based on a total amount of the organic chemical blend additive.

2. The organic chemical blend additive corrosion inhibitor of claim 1 where the nitrate is in solution form and present in the organic chemical blend additive in an amount less than 2 wt. %, based on the total amount of the organic chemical blend additive.

3. The organic chemical blend additive corrosion inhibitor of claim 1 where the nitrate is selected from a group consisting of calcium nitrate, sodium nitrate, potassium nitrate, and a combination thereof.

4. The organic chemical blend additive corrosion inhibitor of claim 3 where amount of nitrate present in the blend ranges from about 0.25% of a 45% aqueous solution of nitrate salt to about 5% of a 45% aqueous solution of the nitrate salt.

5. The organic chemical blend additive corrosion inhibitor of claim 1 where the amount of maleic acid copolymer in the organic chemical blend additive ranges from about 1 wt. % to about 15 wt. %.

6. The organic chemical blend additive corrosion inhibitor of claim 1 further comprising an imidazoline.

7. The organic chemical blend additive corrosion inhibitor of claim 6 where the imidazoline has a general formula:

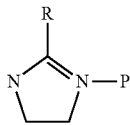

where R is a tall oil fatty acid and where P is selected from a group consisting of $(CH_2-CH_2)$-X, $(CH_2-CH_2-O)_nH$, and $CH_2-CH_2-(NH-CH_2-CH_2)_yNH-CO-R1$; wherein X is $NH_2$, OH, or $NH-CO-R2$, n is 10, and y is equal to or greater than 2.

8. The organic chemical blend additive corrosion inhibitor of claim 7 where the amount of the imidazoline in the organic chemical blend additive corrosion inhibitor may range from about 5 wt. % independently to about 30 wt. %.

9. An organic chemical blend additive corrosion inhibitor comprising:
a nitrate in solution form and present in the organic chemical blend additive in an amount less than 2 wt. %, based on the total amount of the organic chemical blend additive;
a maleic acid copolymer in an amount from about 1 wt. % to about 15 wt. %, where the maleic acid copolymer is a polycarboxylic acid having the following chemical description: propenoic acid, ethyl ester, polymer with ethenyl acetate and 2,5 furandione, hydrolyzed;
an organic solvent in an amount greater than 50 wt. %, based on a total amount of the organic chemical blend additive; and
less than 10 wt. % water, based on a total amount of the organic chemical blend additive.

10. The organic chemical blend additive corrosion inhibitor of claim 9 where the nitrate is selected from a group consisting of calcium nitrate, sodium nitrate, potassium nitrate, and a combination thereof.

11. The organic chemical blend additive corrosion inhibitor of claim 9 further comprising an imidazoline.

12. The organic chemical blend additive corrosion inhibitor of claim 11 where the amount of the imidazoline in the organic chemical blend additive corrosion inhibitor may range from about 5 wt. % independently to about 30 wt. %.

13. An organic chemical blend additive corrosion inhibitor comprising:
a nitrate selected from a group consisting of calcium nitrate, sodium nitrate, potassium nitrate, and a combination thereof;
a maleic acid copolymer is a polycarboxylic acid having the following chemical description: propenoic acid, ethyl ester, polymer with ethenyl acetate and 2,5 furandione, hydrolyzed;
an organic solvent in an amount greater than 50 wt. %, based on a total amount of the organic chemical blend additive; and
less than 10 wt. % water, based on a total amount of the organic chemical blend additive.

14. The organic chemical blend additive corrosion inhibitor of claim 13 where the nitrate is in solution form and present in the organic chemical blend additive in an amount less than 2 wt. %, based on the total amount of the organic chemical blend additive.

15. The organic chemical blend additive corrosion inhibitor of claim 14 where amount of nitrate present in the blend ranges from about 0.25% of a 45% aqueous solution of nitrate salt to about 5% of a 45% aqueous solution of the nitrate salt.

16. The organic chemical blend additive corrosion inhibitor of claim 13 where the amount of maleic acid copolymer in the organic chemical blend additive ranges from about 1 wt. % to about 15 wt. %.

17. The organic chemical blend additive corrosion inhibitor of claim 13 further comprising an imidazoline.

18. The organic chemical blend additive corrosion inhibitor of claim 17 where the amount of the imidazoline in the organic chemical blend additive corrosion inhibitor may range from about 5 wt. % independently to about 30 wt. %.

* * * * *